United States Patent
Lin

(10) Patent No.: US 8,103,808 B2
(45) Date of Patent: Jan. 24, 2012

(54) MULTIMEDIA KVM SYSTEM

(75) Inventor: Sheng-Peng Lin, Taipei (TW)

(73) Assignee: Aten International Co., Ltd., Shijr (TW)

( * ) Notice: Subject to any disclaimer, the term of this patent is extended or adjusted under 35 U.S.C. 154(b) by 290 days.

(21) Appl. No.: 11/954,443

(22) Filed: Dec. 12, 2007

(65) Prior Publication Data

US 2009/0157922 A1   Jun. 18, 2009

(51) Int. Cl.
G06F 3/00 (2006.01)
G06F 13/12 (2006.01)
G06F 13/38 (2006.01)
G09G 5/00 (2006.01)

(52) U.S. Cl. ............... 710/18; 710/73; 345/156
(58) Field of Classification Search .......... 710/73, 710/18; 345/156
See application file for complete search history.

(56) References Cited

U.S. PATENT DOCUMENTS

| | | | |
|---|---|---|---|
| 6,122,259 A | | 9/2000 | Ishida |
| 2002/0149672 A1* | 10/2002 | Clapp et al. ............ 348/14.09 |
| 2003/0218578 A1* | 11/2003 | Ahern et al. ............... 345/2.1 |
| 2005/0066000 A1* | 3/2005 | Liaw et al. ............... 709/204 |
| 2005/0268329 A1* | 12/2005 | Lee et al. ................... 726/3 |
| 2006/0034299 A1* | 2/2006 | Barzegar et al. ........ 370/401 |
| 2008/0005421 A1* | 1/2008 | Chang et al. ............. 710/62 |

FOREIGN PATENT DOCUMENTS

WO   02/089386   11/2002

OTHER PUBLICATIONS

Office Action issued by the China State Intellectual Property Office on Jan. 29, 2010 in the counterpart Chinese patent application No. 200810214631.8.
Chinese Office Action in counterpart application, No. CN 200810214631.8, dated Feb. 2, 2010.
ATEN International Co., Ltd., "KN4140v KVM Over the NET™".

* cited by examiner

Primary Examiner — Alford W. Kindred
Assistant Examiner — Farley Abad
(74) Attorney, Agent, or Firm — Chen Yoshimura LLP

(57) ABSTRACT

Multimedia KVM systems are provided. A multimedia KVM system comprises a KVM switch and a local console coupled to the KVM switch. The KVM switch comprises a plurality of first connectors for connecting to a plurality of first multimedia components, respectively. The local console comprises a plurality of second connectors for connecting to a plurality of second multimedia components, respectively. A first user utilizes the first multimedia components, via the local console and the KVM switch, to communicate with a second user utilizing the second multimedia components.

13 Claims, 5 Drawing Sheets

MULTIMEDIA KVM SYSTEM

BACKGROUND OF THE INVENTION

1. Field of the Invention

The disclosure relates generally to KVM systems, and, more particularly to multimedia KVM systems having multimedia components.

2. Description of the Related Art

A KVM switch is a hardware device that allows a user to control multiple hosts such as computers connected via a plurality of computer ports from a keyboard, video monitor and mouse. The KVM switch will pass signals between the hosts and the keyboard, video monitor and mouse. The KVM switch can generate related data for operations, and receive or output videos and/or audios via the ports.

Generally, a local console or a remote client can couple to the KVM switch to control the hosts connected with the KVM switch. The KVM switch usually acts as an intermediate interface to pass control signals and data between the hosts and the local console or a remote client. Conventionally, users at the local console, the remote client, and the KVM switch have no 'real time' communication abilities. For example, they cannot discuss the host situation, and/or monitor the audio and/or video of the environments where the hosts operate therein.

BRIEF SUMMARY OF THE INVENTION

Multimedia KVM systems are provided.

An embodiment of a multimedia KVM system comprises a KVM switch and a local console coupled to the KVM switch. The KVM switch comprises a plurality of first connectors for connecting to a plurality of first multimedia components, respectively. The local console comprises a plurality of second connectors for connecting to a plurality of second multimedia components, respectively. A first user utilizes the first multimedia components, via the local console and the KVM switch, to communicate with a second user utilizing the second multimedia components.

An embodiment of a multimedia KVM system comprises a KVM switch and a remote client connected to the KVM switch via a network. The KVM switch comprises a plurality of first connectors for connecting to a plurality of first multimedia components, respectively. The remote client comprises a plurality of second connectors for connecting to a plurality of second multimedia components. A first user utilizes the first multimedia components, via the KVM switch, the network and the remote client, to communicate with a second user utilizing the second multimedia components.

BRIEF DESCRIPTION OF THE DRAWINGS

The invention will become more fully understood by referring to the following detailed description with reference to the accompanying drawings, wherein.

DETAILED DESCRIPTION OF THE INVENTION

Multimedia KVM systems are provided.

Figure 1:
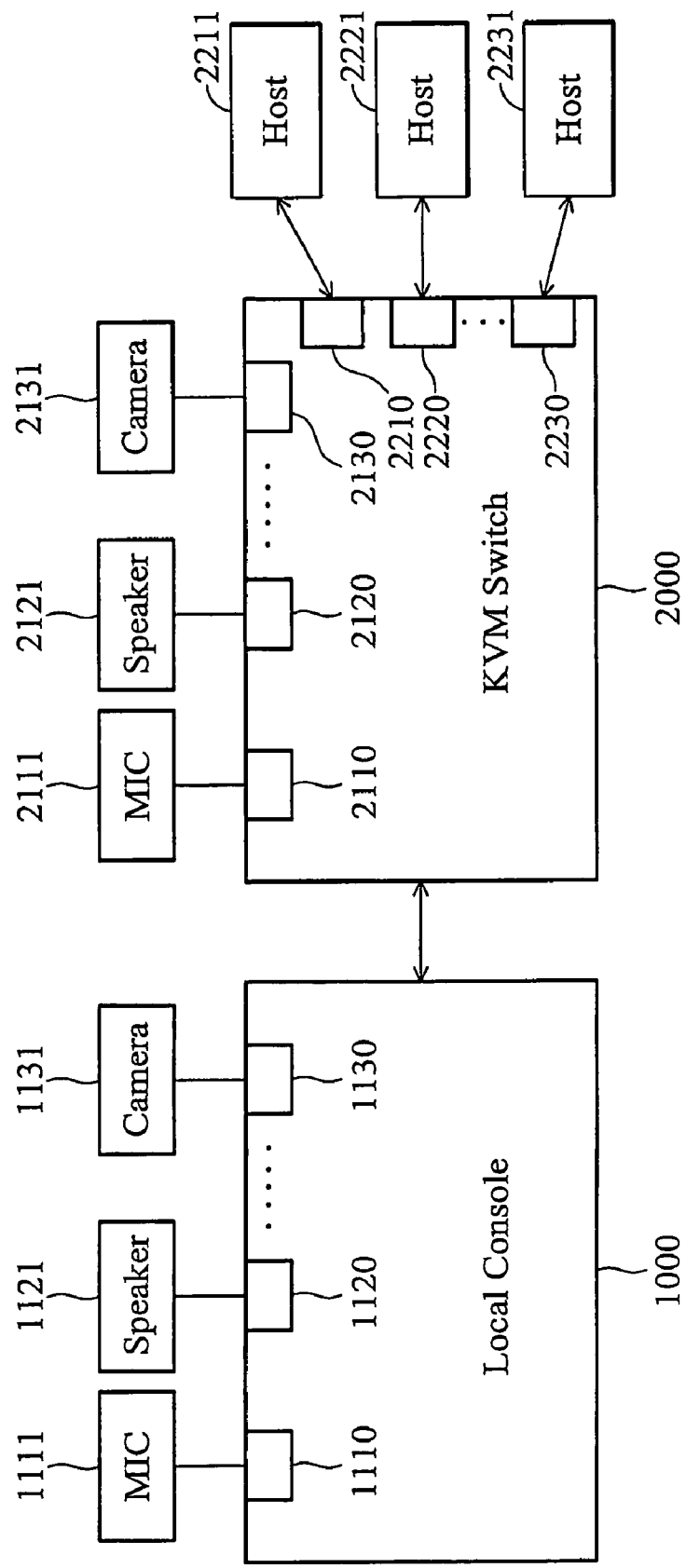
FIG. 1 is a schematic diagram illustrating an embodiment of a multimedia KVM system of the invention.

FIG. 1 is a schematic diagram illustrating an embodiment of a multimedia KVM system of the invention.

As shown in FIG. 1, the multimedia KVM system comprises a local console 1000 and a KVM switch 2000. The local console 1000 couples to the KVM switch 2000 via a CAT5 cable. The local console 1000 comprises a plurality of connectors for connecting to a plurality of multimedia components, respectively. For example, the local console 1000 comprises connectors 1110, 1120 and 1130, such as a microphone connector, a speaker connector, and a camera connector for connecting to a microphone 1111, a speaker 1121 and a camera 1131, respectively. Similarly, the KVM switch 2000 comprises a plurality of connectors for connecting to a plurality of multimedia components, respectively, wherein connector 2110 connects to a microphone 2111, connector 2120 connects to a speaker 2121, and connector 2130 connects to a camera 2131. The KVM switch 2000 further comprises a plurality of computer ports, each connecting to a host. For example, computer port 2210 connects to host 2211, computer port 2220 connects to host 2221, and computer port 2230 connects to host 2231. The KVM switch 2000 allows users to control the hosts from a keyboard, video monitor and mouse connected to the local console 1000 and/or the KVM switch 2000. In one embodiment, each host or computer connects to the KVM switch 2000 via a direct connecting cable. In other embodiment, each host or computer connects to the KVM switch 2000 via CAT 5 cable and a signal converting extender/dongle.

The local console 1000 can communicate with the KVM switch 2000 using the multimedia components. That is, a user at the local console 1000 can utilize the multimedia components of the local console 1000, via the local console 1000 and the KVM switch 2000, to communicate with another user at the KVM switch 2000 utilizing the multimedia components of the KVM switch 2000. For example, the microphone 1111 captures audio from the local console 1000, and the camera 1131 captures video from the local console 1000. The captured data is transmitted to the KVM switch 2000. The received audio is output to the speaker 2121 of the KVM switch 2000, and the received video is output to a monitor (not shown) of the KVM switch 2000 for display. Similarly, the microphone 2111 captures audio from the KVM switch 2000, and the camera 2131 captures video from the KVM switch 2000. The captured data is transmitted to the local console 1000. The received audio is output to the speaker 1121 of the local console 1000, and the received video is output to a monitor (not shown) of the local console 1000 for display.

In some embodiments, a status such as audio and/or video of an environment where the KVM switch 2000 or any of the hosts operating therein can be captured using the multimedia components of the KVM switch 2000 or the multimedia components of respective hosts (not shown). The local console 1000 can receive and monitor the status of the environment where the KVM switch 2000 or any of the hosts operating therein using the multimedia components of the local console 1000. For example, the received audio is output to the speaker 1121, and the received video is output to a monitor (not shown) for display.

Figure 2:
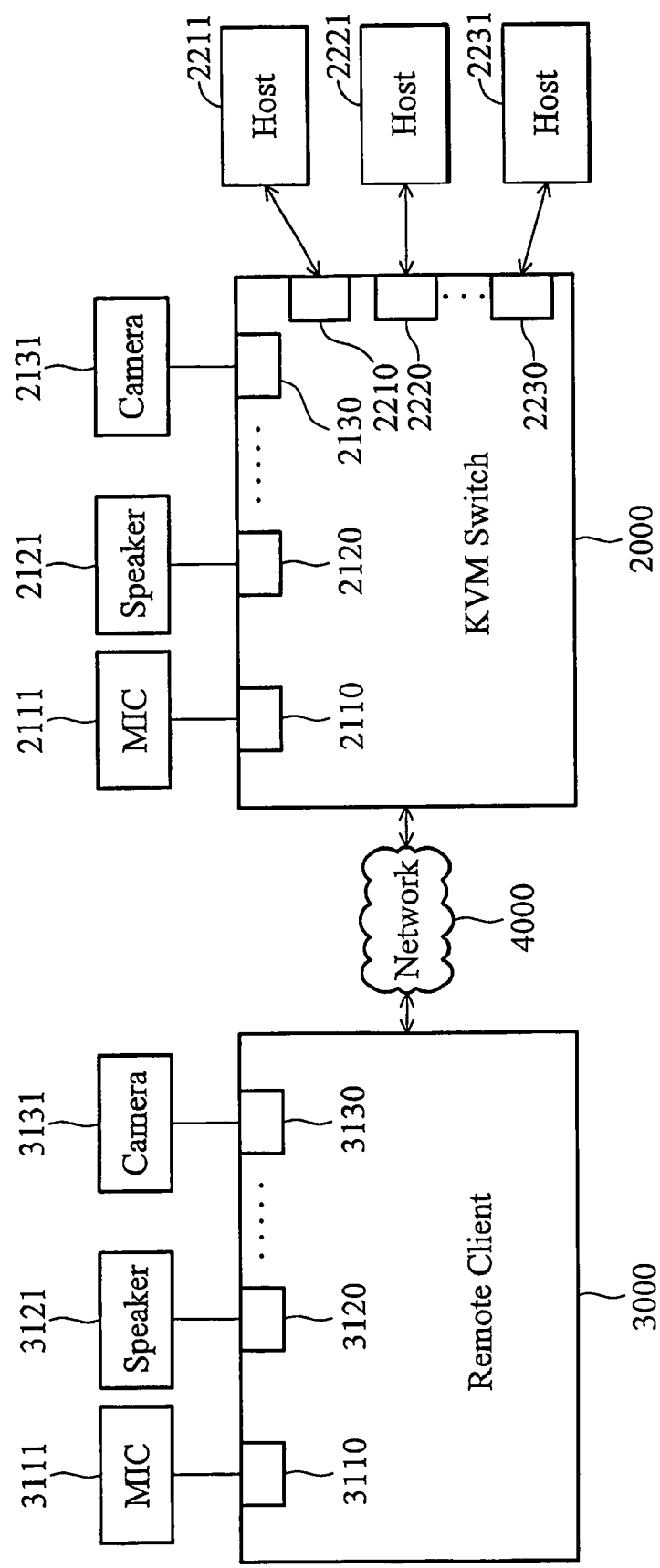
FIG. 2 is a schematic diagram illustrating another embodiment of a multimedia KVM system of the invention.

FIG. 2 is a schematic diagram illustrating another embodiment of a multimedia KVM system of the invention.

As shown in FIG. 2, the multimedia KVM system comprises a remote client 3000 and a KVM switch 2000. The remote client 3000 couples to the KVM switch 2000 via a network 4000. The network 4000 may be an Internet, Ethernet, Intranet, wide area network (WAN), local area network (LAN) or wireless network. The remote client 3000 comprises a plurality of connectors for connecting to a plurality of multimedia components, respectively. For example, the remote client 3000 comprises connectors 3110, 3120 and 3130, such as a microphone connector, a speaker connector, and a camera connector for connecting to a microphone 3111, a speaker 3121 and a camera 3131, respectively. Similarly, the KVM switch 2000 comprises a plurality of connectors for connecting to a plurality of multimedia components, respectively, wherein connector 2110 connects to a microphone 2111, connector 2120 connects to a speaker 2121, and connector 2130 connects to a camera 2131. The KVM switch 2000 further comprises a plurality of computer ports, each connecting to a host. For example, computer port 2210 connects to host 2211, computer port 2220 connects to host 2221, and computer port 2230 connects to host 2231. The KVM switch 2000 allows users to control the hosts from a keyboard, video monitor and mouse connected to the remote client 3000 and/or the KVM switch 2000.

The remote client 3000 can communicate with the KVM switch 2000 using the multimedia components. That is, a user at the remote client 3000 can utilize the multimedia components of the remote client 3000, via the remote client 3000, the network 4000 and the KVM switch 2000, to communicate with another user at the KVM switch 2000 utilizing the multimedia components of the KVM switch 2000. In some embodiments, a status such as audio and/or video of an environment where the KVM switch 2000 or any of the hosts operating therein can be captured using the multimedia components of the KVM switch 2000 or the multimedia components of respective hosts (not shown). The remote client 3000 can receive and monitor the status of the environment where the KVM switch 2000 or any of the hosts operating therein using the multimedia components of the remote client 3000. In one embodiment, the remote client includes computer, personal digital assistant (PDA), or cellular phone. For example, the microphone 3111 captures audio from the remote client 3000, and the camera 3131 captures video from the remote client 3000. The captured data is transmitted to the KVM switch 2000 via the network 4000. The received audio is output to the speaker 2121 of the KVM switch 2000, and the received video is output to a monitor (not shown) of the KVM switch 2000 for display. Similarly, the microphone 2111 captures audio from the KVM switch 2000, and the camera 2131 captures video from the KVM switch 2000. The captured data is transmitted to the remote client 3000 via the network 4000. The received audio is output to the speaker 3121 of the remote client 3000, and the received video is output to a monitor (not shown) of the remote client 3000 for display.

Figure 3:
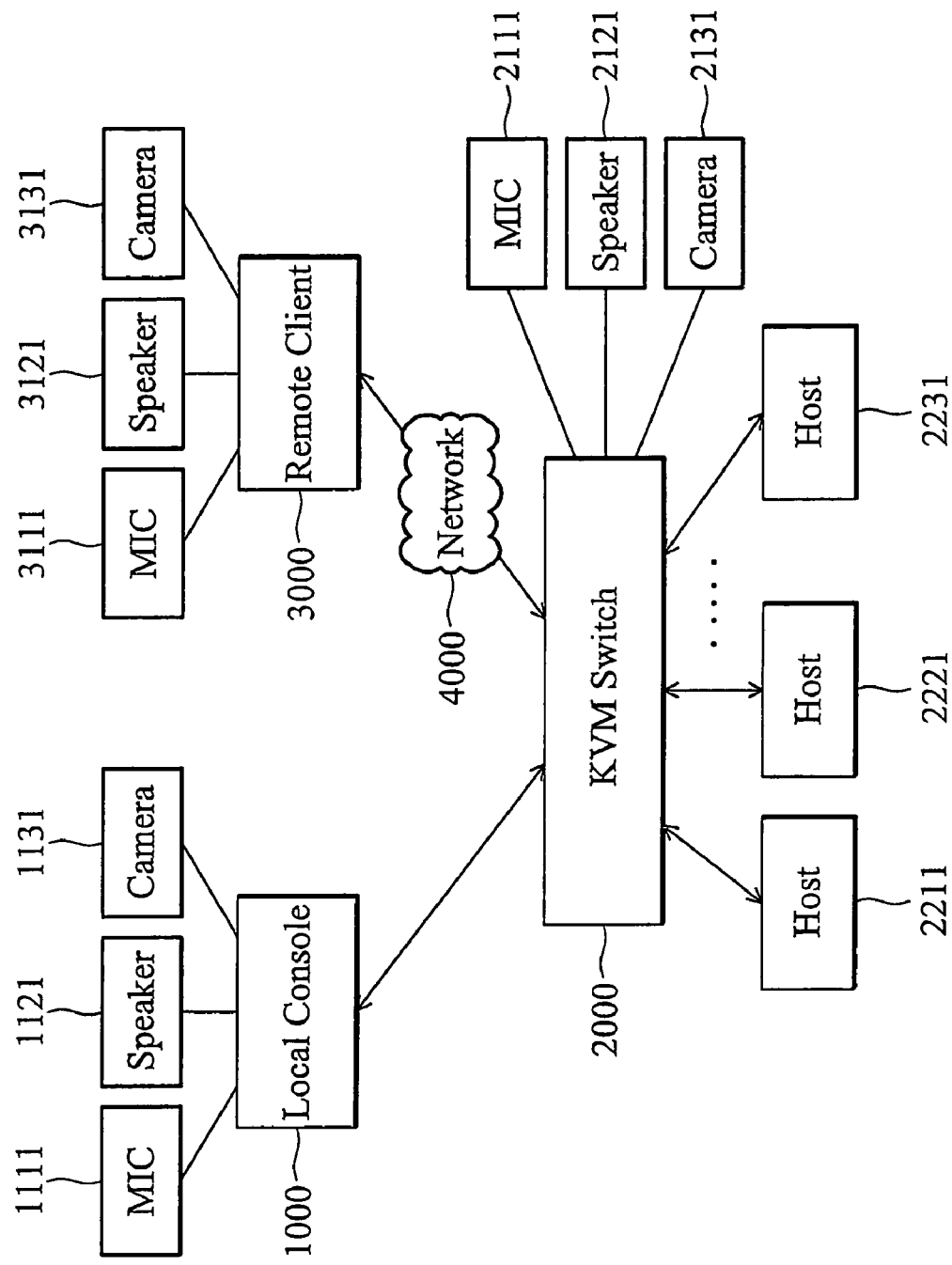
FIG. 3 is a schematic diagram illustrating still another embodiment of a multimedia KVM system of the invention.

FIG. 3 is a schematic diagram illustrating still another embodiment of a multimedia KVM system of the invention.

In this embodiment, the multimedia KVM system comprises a local console 100, a KVM switch 2000, and a remote client 3000. The local console 1000 couples to the KVM switch 2000 via a CAT5 cable. The local console 1000 comprises multimedia components, such as a microphone 1111, a speaker 1121 and a camera 1131. The remote client 3000 couples to the KVM switch 2000 via a network 4000, such as an Internet, Ethernet, Intranet, wide area network (WAN), local area network (LAN) or wireless network. The remote client 3000 comprises multimedia components, such as a microphone 3111, a speaker 3121 and a camera 3131. The KVM switch 2000 comprises multimedia components, such as a microphone 2111, a speaker 2121 and a camera 2131. The KVM switch 2000 further comprises a plurality of computer ports for connecting to a plurality of hosts (2211, 2221 and 2231). The KVM switch 2000 allows users to control the hosts from a keyboard, video monitor and mouse connected to the remote client 3000 and/or the remote client 3000 and/or the KVM switch 2000.

In this embodiment, users at the local console 1000, the KVM switch 2000 or/and the remote client 3000 can communicate with each other using the multimedia components thereof. For example, a user at the local console 1000 can utilize the multimedia components of the local console 1000, via the local console 1000 and the KVM switch 2000, to communicate with another user at the KVM switch 2000 utilizing the multimedia components of the KVM switch 2000. A user at the remote client 3000 can utilize the multimedia components of the remote client 3000, via the remote client 3000 and the KVM switch 2000, to communicate with another user at the KVM switch 2000 utilizing the multimedia components of the KVM switch 2000. A user at the local console 1000 can utilize the multimedia components of the local console 1000, via the local console 1000, the KVM switch 2000 and the remote client 3000, to communicate with another user at the remote client 3000 utilizing the multimedia components of the remote client 3000. Further, a status such as audio and/or video of an environment where the KVM switch 2000 or any of the hosts operating therein can be captured using the multimedia components of the KVM switch 2000 or the multimedia components of respective hosts (not shown). The local console 1000 or/and the remote client 3000 can receive and monitor the status of the environment where the KVM switch 2000 or any of the hosts operating therein using the multimedia components thereof. In one embodiment, the three users can communicate with each other by the local consol 1000, the KVM switch 2000, the network 4000, the remote client 3000 and the multimedia components connected to the local consol 1000, the KVM switch 2000, and the remote client 3000.

Figure 4:
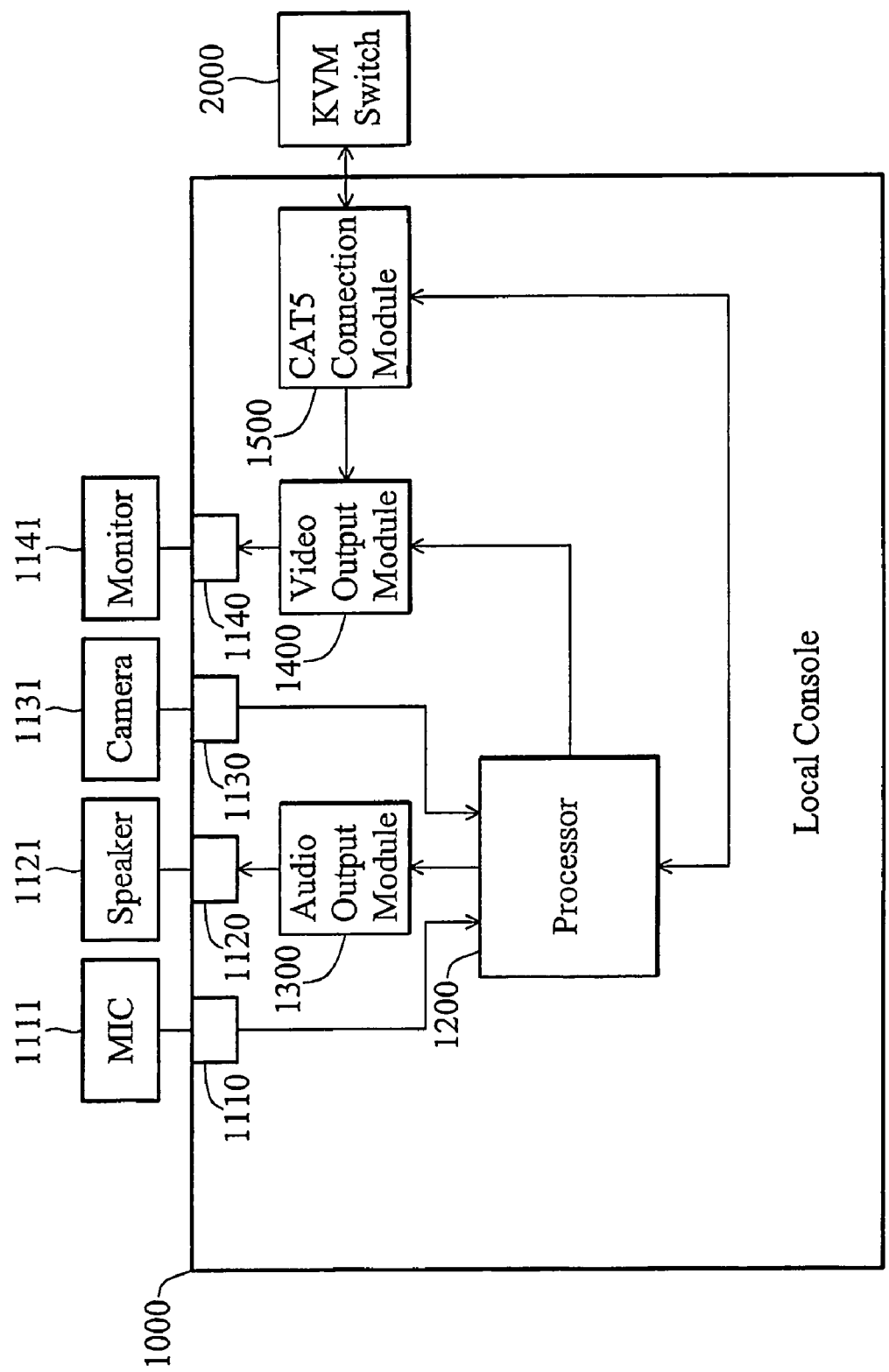
FIG. 4 is a schematic diagram illustrating an embodiment of a local console of the invention.

FIG. 4 is a schematic diagram illustrating an embodiment of a local console of the invention.

As shown in FIG. 4, the local console 1000 comprises a plurality of connectors, wherein connector 1110 connects to a microphone 1111, connector 1120 connects to a speaker 1121, connector 1130 connects to a camera 1131, and connector 1140 connects to a monitor 1141. The processor 1200 controls related processes of the local console 1000. The audio captured by the microphone 1111 and the video captured by the camera 1131 are transmitted to the processor 1200. The processor 1200 compresses the audio and the video, and transmits the compressed audio and video to the KVM switch 2000 via a CAT5 connection module 1500 and a CAT5 cable. In some embodiments, the captured audio and video can be converted from analog into digital before compression, and the compressed digital audio and video can be transmitted to the KVM switch 2000 via a specific high-speed transmission channel of the CAT5 cable.

The local console 1000 may also receive video and/or audio from the KVM switch 2000. It is understood that the received video and/or audio may be from the hosts controlled by the KVM switch 2000, or captured by the multimedia components of the KVM switch 2000 or the remote client 3000. If the received video is from the hosts controlled by the KVM switch 2000, the CAT5 connection module 1500 directly transmits the received video to a video output module 1400, and the video output module 1400 displays the received video in the monitor 1141. If the received video and/or audio are captured by the multimedia components of the KVM switch 2000 or the remote client 3000, the CAT5 connection module 1500 transmits the received video and/or audio to the processor 1200. The processor 1200 converts the received video and/or audio from digital to analog, and decompresses the received video and/or audio. The decompressed video and/or audio are then respectively transmitted to the video output module 1400 and/or an audio output module 1300 for output. It is understood that, in some embodiments, the video sources (video from the hosts, video captured by the KVM switch 2000, the remote client 3000 and the local console 1000) can be differentiated according to a specific identification number, and the video from respective video sources can be respectively or simultaneously displayed in the monitor 1141. It is understood that an interface can be provided for users to determine which terminal (KVM switch 2000 or remote client 3000) is to be communicated with. If one terminal is selected, the captured video and/or audio are transmitted to the selected terminal.

Figure 5:
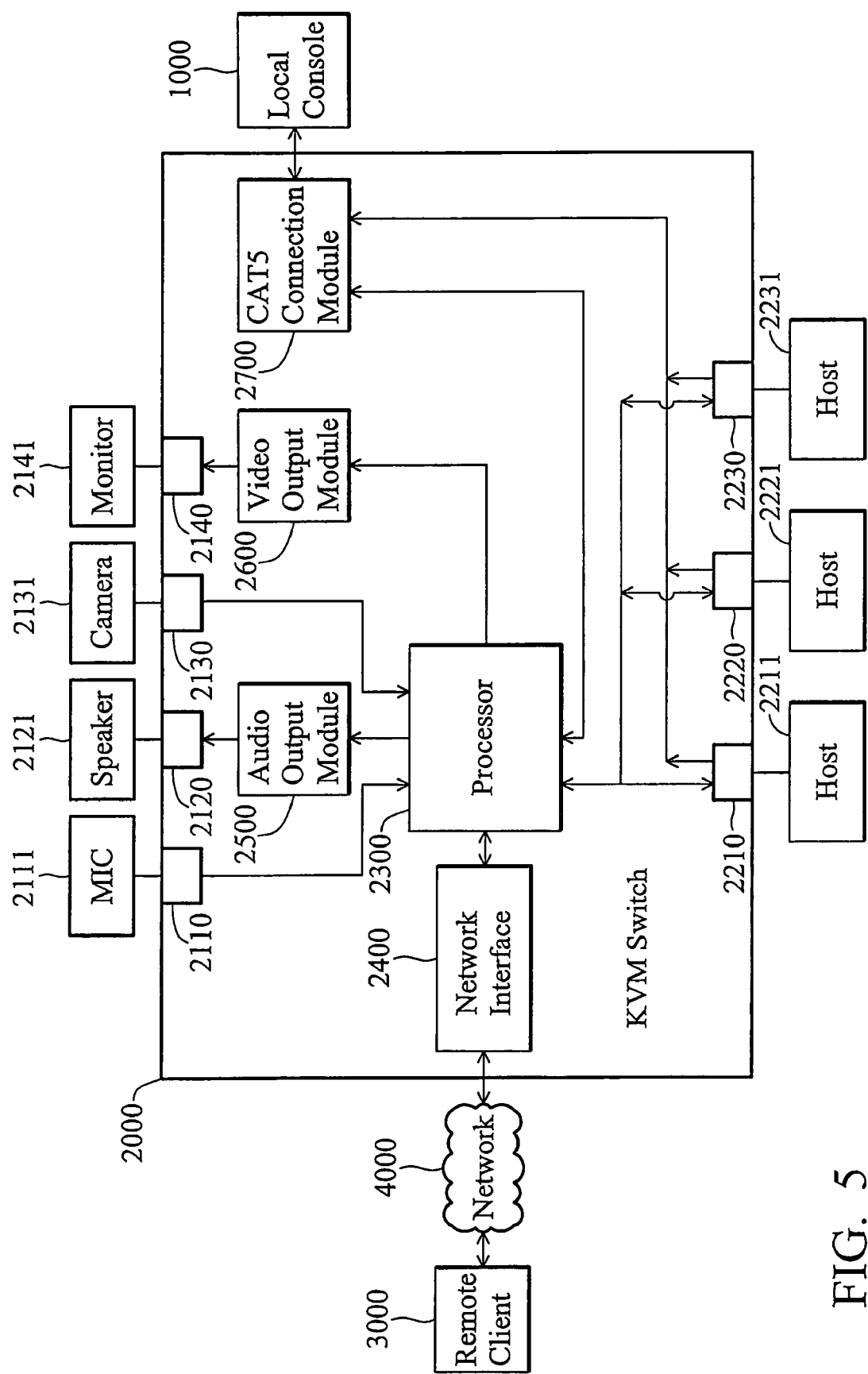
FIG. 5 is a schematic diagram illustrating an embodiment of a KVM switch of the invention.

FIG. 5 is a schematic diagram illustrating an embodiment of a KVM switch of the invention.

As shown in FIG. 5, the KVM switch 2000 comprises a plurality of connectors, wherein connector 2110 connects to a microphone 2111, connector 2120 connects to a speaker 2121, connector 2130 connects to a camera 2131, and connector 2140 connects to a monitor 2141. The KVM switch 2000 comprises a plurality of computer ports, wherein port 2210 connects to a host 2211, port 2220 connects to a host 2221, and port 2230 connects to a host 2231. The processor 2300 controls related processes of the KVM switch 2000. The KVM switch 2000 comprises a network interface 2400 for connecting to a remote client 3000 via a network 4000. The audio captured by the microphone 2111 and the video captured by the camera 2131 are transmitted to the processor 2300. The processor 2300 compresses the audio and the video, and transmits the compressed audio and video to the local console 1000 via a CAT5 connection module 2700 and a CAT5 cable, or to the remote client 3000 via the network interface 2400 and the network 4000. The compressed digital audio and video can be transmitted to the local console 1000 via a specific high-speed transmission channel of the CAT5 cable. Similarly, the captured audio and video can be converted from analog into digital before compression.

The KVM switch 2000 may also receive video and/or audio from the local console 1000 or the remote client 3000. The received video and/or audio from the local console 1000 or the remote client 3000 are converted by the processor 2300 from digital to analog, and decompressed. The decompressed video and/or audio are then respectively transmitted to a video output module 2600 and/or an audio output module 2500 for output. It is noted that in some embodiments, the video and/or audio from the remote client 3000 may be directly transmitted to the CAT5 connection module 2700, and forwarded to the local console 1000.

As described, several hosts are coupled to the KVM switch 2000. The KVM switch 2000 receives video from the hosts, and the received video can be directly transmitted to the CAT5 connection module 2700, and forwarded to the local console 1000. Additionally, the received video can be converted and compressed by the processor 2300, and transmitted to the local console 1000 via the CAT5 connection module 2700 and the CAT5 cable, or transmitted to the remote client 3000 via the network interface 2400 and the network 4000. Further, the KVM switch 2000 receives or transmits operating signals comprising keyboard and mouse commands from/to the hosts. The operating signals can be transmitted and received to/from the local console 1000 via the specific high-speed transmission channel of the CAT5 cable. In one embodiment, video captured by the camera, keyboard signal, mouse signal are transmitted in one pair of twist line in CAT 5 cable connected between the local console 1000 and the KVM switch 2000. In other embodiment, audios from host and microphone can be distinguished by application program/firmware/software in the local console 1000, the KVM switch 2000 or the remote client 3000. Videos from host and camera can be displayed in picture frame in the monitor connected the local console 1000, the KVM switch 2000 or the remote client 3000.

Operating methods of the multimedia KVM systems, or certain aspects or portions thereof, may take the form of a program code (i.e., executable instructions) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A multimedia keyboard, video, mouse (KVM) system, comprising:
    a KVM switch comprising a plurality of computer ports for connecting to a plurality of hosts, at least one console connection module, and at least one network interface;
    the console connecting module provided such that a local console can be coupled thereto for generating keyboard and mouse data for controlling a host, wherein the KVM switch connects the keyboard and mouse data generated by the local console to a selected one of the plurality of hosts to control the selected host,
    the at least one network interface provided such that a remote client can be connected thereto via a network for generating keyboard and mouse data for controlling a host, wherein the KVM switch connects the keyboard and mouse data generated by the remote client to another selected one of the plurality of hosts to control the selected host,
    wherein the KVM switch connects a plurality of first multimedia component connectors on the local console to a plurality of second multimedia component connectors on the remote client to establish two-way audio-visual communication between the local console and the remote client.

2. The system of claim 1, wherein the first connectors comprise a microphone connector, a speaker connector, or a camera connector.

3. The system of claim 1, wherein the second connectors comprise a microphone connector, a speaker connector, or a camera connector.

4. The system of claim 1, wherein the network comprises an Internet, Ethernet, Intranet, wide area network (WAN), local area network (LAN) or wireless network.

5. The system of claim 1, wherein the remote client includes computer, personal digital assistant (PDA), or cellular phone.

6. The system of claim 1, wherein the local console coupled to the KVM switch via a Category 5 cable.

7. A multimedia keyboard, video, mouse (KVM) system, comprising:
- a KVM switch comprising a plurality of computer ports for connecting to a plurality of hosts, a first console connection module, and a second console connection module;
- the first console connection module provided such that a first console can be coupled thereto for generating keyboard and mouse data for controlling a host, wherein the KVM switch connects the keyboard and mouse data generated by the first console to a selected one of the plurality of hosts to control the selected host,
- the second console connection module provided such that a second console can be coupled thereto for generating keyboard and mouse data for controlling a host, wherein the KVM switch connects the keyboard and mouse data generated by the second console to another selected one of the plurality of hosts to control the selected host,
- wherein the KVM switch connects a plurality of first multimedia component connectors on the first console to a plurality of second multimedia component connectors on the second console to establish two-way audio-visual communication between the first console and the second console.

8. The system of claim 7, wherein the first connectors comprise a microphone connector, a speaker connector, or a camera connector.

9. The system of claim 7, wherein the second connectors comprise a microphone connector, a speaker connector, or a camera connector.

10. A multimedia keyboard, video, mouse (KVM) system, comprising:
- a KVM switch comprising a plurality of computer ports for connecting to a plurality of hosts, a console connection module, and a plurality of first multimedia component connectors for directly connecting to a plurality of first multimedia component respectively; and
- the console connection module provided such that a console can be coupled thereto for generating keyboard and mouse data for controlling a host, wherein the KVM switch connects the keyboard and mouse data generated by the console to a selected one of the plurality of hosts to control the selected host,
- wherein the KVM switch connects the plurality of first connectors on the KVM switch to a plurality of second multimedia component connectors on the console to establish two-way audio-visual communication between the KVM switch and the console.

11. The system of claim 10, wherein the console further monitors status of an environment where the KVM switch using the first and second multimedia components.

12. The system of claim 11, wherein the status comprises audio or video of the environment.

13. The system of claim 10, wherein the first multimedia component connectors comprise a microphone connector, a speaker connector, or a camera connector.

* * * * *